Sept. 29, 1942.    M. W. DITTO ET AL    2,296,826
PROCESS FOR THE TREATMENT OF RUBBER OR THE LIKE
Filed Jan. 19, 1940
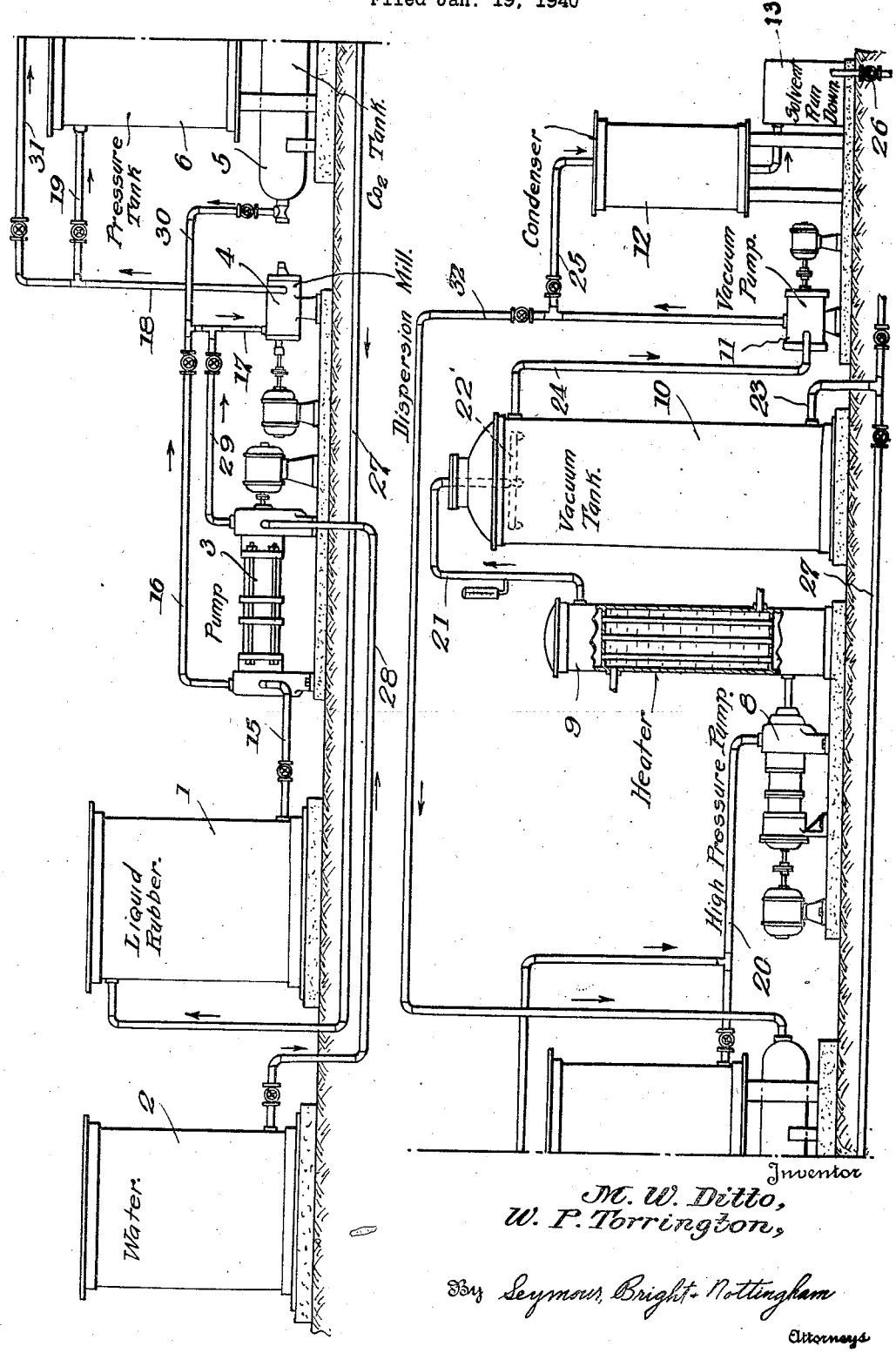
Inventor
M. W. Ditto,
W. P. Torrington,
By Seymour, Bright & Nottingham
Attorneys Patented Sept. 29, 1942

2,296,826

UNITED STATES PATENT OFFICE 2,296,826

PROCESS FOR THE TREATMENT OF RUBBER OR THE LIKE

Marvin W. Ditto and William P. Torrington, New York, N. Y., assignors to Emulsions Process Corporation, New York, N. Y., a corporation of Delaware Application January 19, 1940, Serial No. 314,734

7 Claims. (Cl. 260—767)

This invention relates to improved processes of treating crude rubber or the like.

One of the objects of the invention is to provide a process for the production of a uniform rubber compound having superior nerve.

A further object is to supply a process capable of breaking down the skeletonized rubber structure to allow a uniformity of the two phases of the rubber (sol and gel), without the use of prolonged mechanical treatment such as milling or the like.

Another object is to provide a novel process to not only increase the swelling of rubber cement but to break down the larger aggregate rubber cells of the same, thereby releasing the highly soluble rubber contained within them.

Another object is to supply a process whereby water can be finely dispersed within dissolved rubber in which the rubber cells have been previously broken down.

Experiments by Freundlich and Hauser have demonstrated that rubber in latex has a cellular structure in which each rubber particle possesses a thin outside layer or skin of tough elastic material. The striking elasticity and insolubility of the shell or skin in water or other solvents seems to prove that it cannot consist of proteins. It was observed by them that these rubber particles swelled materially in benzene or other solvents which increased the diameter of the particle to three or more times the original value, thus indicating that the cell wall, while insoluble in benzene or solvents, is so permeable that swelling of the inner contents takes place.

As to the composition of such shell, there are considerable differences of opinion; some authorities consider it may be some form of polymerized rubber. Others consider it might be a form of lipoids (sterols, lechtin, esters of sterol). Freundlich and Hauser also believe that they have established the fact that the rubber hydrocarbon is in a different form when in latex than when in crude rubber. During investigations made with micromanipulators they could observe no change in the consistency or structure of the rubber particles in latex as long as an aqueous dispersion medium is present, but as soon as the water is eliminated, the inner fluid material of the particles becomes increasingly viscous until it assumes gel form, the contour of the particles remaining, the shells functioning as a framework or skeleton to a certain extent. The shells also become considerably more solid in consistency.

This theory is further borne out by the work of Feutcher who studied the fractionation of rubber and repeated the work of Caspari, confirming the fact that a difficult soluble portion of the rubber remains after treatment with various solvents such as ether or petroleum ether, but showed that 78 to 82% of the principal soluble portion composed the most important properties of rubber. The insoluble portion which contained all of the impurities he called the gel skeleton, and considered it contributed nothing to the elastic properties of rubber. Therefore, it appears from the work done by these various investigators that rubber consists of two phases, there being a highly soluble phase which is called sol rubber surrounded by an elastic skin which may be punctured to allow the viscous content to escape. These elastic skins being soluble with difficulty, are called gel rubber. While some authorities presume that this so-called shell or hull substance consists of some form of rubber, there is no definite evidence of this, and it may be a mixture of rubber, resin, proteins, etc. It would therefore appear that rubber, whether in the form of a dispersoid as it is present in latex, or in the coagulated form such as smoked sheets, of acid coagulated latex, consists of two phases or rubber, one being a relatively easily soluble compound contained within minute cells of a relatively insoluble form of rubber which is permeable to rubber solvents to allow the contents to swell by absorption of solvent.

This theory is further borne out by work that has been done on the nerve of crude rubber, in which it has been observed that crepe rubber, in the manufacture of which a continuous rupture of the rubber takes place, possesses a certain degree of nerve. In contrast, rubber in the manufacture of which latex or still wet coagulum is heated, is usually distinguished by a different degree of nerve. F. Kirchhof explains the greater nerve acquired by crepe rubber after it is heated and pressed, by stating that the mechanical working of the rubber ruptures the hulls surrounding the individual rubber particles, so that a fusion of the inner parts of the particles can take place.

A further discussion of the subject may be found in Science of Rubber, by Memmbler, particularly at pages 66, 174, 175, 176, 423, 472 and 473.

From such publication it is believed that it has been reasonably well established that a process which will break down the skeletonized rubber structure and allow a uniformity of the two phases without the use of prolonged mechanical treatment, will undoubtedly result in a uniform rubber compound having superior nerve. Therefore, it is another object of our invention to supply a novel method for breaking down such skeletonized rubber structure to secure uniformity of the two phases in an expeditious manner.

With the foregoing objects outlined and with other objects in view which will appear as the description proceeds, the invention consists in the novel features hereinafter pointed out in connection with the accompanying drawing, and more particularly set forth in the appended claims.

The drawing is a side elevation, partly in vertical section, of an apparatus which may be used in practicing the invention.

Referring to the drawing, 1 designates a tank to contain liquid rubber or a solution of crude rubber or the like. 2 is a water tank, and 3 a pump. The latter is preferably a proportioning pump of the kind disclosed in the United States patent application of M. W. Ditto, Serial No. 230,480, filed September 17, 1938. 4 is a dispersion mill, preferably of the type disclosed in the United States patents of M. W. Ditto, No. 2,169,338 or No. 2,169,339, both dated Aug. 15, 1939, or in the application of M. W. Ditto, Serial No. 281,484, filed June 27, 1939.

5 is a storage tank for $CO_2$ or the like, and 6 is a pressure storage tank. 8 designates a high pressure pump; 9 a heater; 10 a vacuum tank; 11 a vacuum pump; 12 a condenser; and 13 a solvent run down tank.

The various units of the apparatus are connected by suitable valve controlled piping which will be described in connection with the operation of the apparatus.

In proceeding to break down the skeletonized rubber structure, the crude rubber, secured either from acid coagulated latex, smoked sheets or other sources of natural rubber, is first commingled with a suitable solvent and deposited in the tank 1. The solvent may be casing head gasoline containing a material amount of gaseous constituents such as butane and propane, and during the greater portion of the treatment, the pressure on the materials is maintained so as to hold the gaseous constituents of the gasoline in liquid condition.

The rubber and solvent is drawn from the tank 1 through pipe 15 into one end of the proportioning pump 3 and is placed under pressure by the latter and forced through pipes 16 and 17 into the dispersion mill 4 which functions by impact, turbulence and shear to finely disperse the solvent in the crude rubber. The material leaves the mill through a pipe 18 which leads the same to a pipe 19 that discharges into the pressure tank 6. In the latter, as the materials are held under superatmospheric pressure, the solvent acts to penetrate the insoluble outer shells of the rubber cells, and to cause swelling of the cells. After sufficient elapsed time for the swelling to reach the maximum has taken place, the mixture is withdrawn from the tank through pipe 20 by the pump 8 which increases the pressure to say about 150 pounds per square inch, and to force the mixture under this pressure through the heater 9 in which the mixture is heated to a temperature of say 212° F., at which point the vapor pressure of the casing head gasoline is approximately 95 pounds, but due to the pressure maintained on the mixture, the gasoline remains in liquid phase. After passing through the heater, the mixture travels through a pipe 21 to a spray head 22 arranged in the upper portion of the vacuum tank 10. Consequently, the mixture is sprayed into a chamber under subatmospheric or vacuum conditions, which causes a considerable percentage of the casing head gasoline, due to the differential pressure and temperature being above the boiling point, to be immediately converted into the vapor state with explosive violence. Inasmuch as the cells have been swelled because of the inner portion of the cell absorbing the solvent, sudden expansion of the light gasoline fraction causes the insoluble elastic outer shells of the cells to burst, thereby releasing the liquefied sol rubber contained within the same. The rubber thus treated can be discharged from the lower portion of the tank 10 through a pipe 23, while the volatilized portion of the solvent is withdrawn through a conduit 24 by the vacuum pump 11, the latter acting to force the vapor through a pipe 25 and the condenser 12 which, of course, condenses such vapor before the condensate accumulates in the rundown tank 13, from which it may be withdrawn through a pipe 26 for reuse as a rubber solvent.

Obviously, our process is not limited to the use of any particular solvent or mixtures thereof, as we can employ any solvent that can be heated to above its normal boiling point while maintaining the same under sufficient pressure to hold it in liquid state. Such a solvent, upon discharging into a zone of substantially atmospheric pressure or lower, rapidly assumes vaporous condition with consequent increase in volume.

This process can be used to make dispersions of rubber in solvents for rubber cements, the various accelerators, vulcanizing agents or any suitable oxides can be combined readily. It can be the starting material for any of the usual rubber compound steps, providing a material that may be readily dispersed without the disadvantage of loss of nerve observed when this is done by means of mechanical milling. As a further step in our process, fine dispersion of water within the dissolved rubber can be secured in the following way.

It is well known that if dissolved rubber and water, or a mixture of latex containing the natural serum and solvent is passed through a suitable mixing apparatus (see M. W. Ditto patent application Serial No. 230,480, filed September 17, 1938), emulsions can be secured that are of value in certain adhesive work. The permanency and density of these emulsions is dependent to a large extent upon the fineness of dispersion of rubber within the emulsion, and so we propose to combine either latex and solvent, or dissolved rubber, and water with $CO_2$ at a low temperature of between 32 and 40° F. We propose to do this in the following way, and when dissolved rubber is used for this purpose, it may be transferred from the vacuum tank 10 through a pipe 27 to the tank 1. In this method of procedure, the dissolved rubber or the like will be passed through the pipe 15 to one end of the proportioning pump 3, and the water will be passed through a pipe 28 to the opposite end of the pump. The pump will cause the dissolved rubber to flow through the pipe 16 and the water to flow through the pipe 29, so that the water and rubber will be introduced into the dispersion mill 4. $CO_2$ from the tank 5 will travel through the pipe 30 and enter the mill with the water and rubber, and in the mill, the water and $CO_2$ will be finely dispersed in the dissolved rubber. The intimate mixture thus obtained is discharged through the pipe 18, and then travels through a pipe 31 and pipe 29 to the high pressure pump 8. Prior to reaching the pump, there is mechanically dispersed $CO_2$ gas and water within a continuous phase of rubber in solution, the latter being preferably prepared as hereinbefore stated. The $CO_2$, as the result of the low temperature and pressure, is present in the water in the form of carbonic acid, and the mechanical emulsion thus made is subjected by the pump 8 to a pressure of approximately 1000 pounds before its temperature is increased to approximately 212° F. in the heater 9. The emulsion is released from this temperature and pressure into the vacuum chamber 10 where explosive expansion of the carbonic acid to $CO_2$ gas takes place, thereby subdividing the previously formed mechanical emulsion into water particles of small size finely dispersed in the dissolved rubber. Obviously, subdivision of water particles by the expansion of soluble gas of this type will cause uniform dispersion of water into particle sizes much below that obtained by any type of mechanical dispersion.

This type of emulsion of crude rubber is extremely valuable when combined with vulcanizing agents and the like for the production of fine mechanical rubber goods for which latex is now used.

The $CO_2$ can be withdrawn from the vacuum tank through pipe 24 by means of the pump 11 which will force the same through the pipe 32 back into the tank 5. Of course, the rubber solution with the water finely dispersed therein will be separately withdrawn from the tank through the pipe 23 and may be led to any suitable point of storage or use.

It will be manifest to those skilled in the art that in making the rubber solution, we can treat any type of rubber to which the process is applicable. We may also employ any suitable volatile solvent having at least a portion that will remain in liquid or absorbed condition under elevated temperatures and proper pressure conditions, but which upon release of the pressure, will instantaneously vaporize and thus cause the desired explosive action. It will also be apparent that instead of employing $CO_2$ in dispersing the aqueous liquid in the rubber solution, we may use any suitable expansible medium, preferably soluble in water, which will act under elevated temperatures, when pressure is released, to instantaneously and violently expand for the purpose of finely dispersing the water particles in the rubber solution.

From the foregoing it is believed that our improvements in the treatment of rubber may be readily understood, and that changes in the details of procedure may be made without departing from the spirit of the invention as expressed in the appended claims.

What is claimed and desired to be secured by Letters Patent is:

1. A process for releasing the highly soluble rubber contained within the cells of crude rubber, comprising finely dispersing a volatile solvent in crude rubber, then maintaining the solvent dispersed in the rubber under superatmospheric pressure for a sufficient elapsed time for the solvent to cause substantially maximum swelling of the cells of the rubber, then heating the dispersion to a temperature sufficient to cause substantially complete vaporization of the solvent while maintaining the dispersion under superatmospheric pressure to prevent such vaporization, and then suddenly releasing the pressure on the dispersion, whereby solvent instantaneously vaporizes and breaks down the skeletonized structure of the crude rubber.

2. A process for releasing the highly soluble rubber contained within the cells of crude rubber, comprising finely dispersing a volatile solvent in crude rubber, then maintaining the solvent dispersed in the rubber under superatmospheric pressure for a sufficient elapsed time for the solvent to cause substantially maximum swelling of the cells of the rubber, then heating the dispersion to a temperature sufficient to cause substantially complete vaporization of the solvent while maintaining the dispersion under superatmospheric pressure of about 150 pounds per square inch to prevent such vaporization, and then suddenly releasing the pressure on the dispersion, whereby solvent instantaneously vaporizes and breaks down the skeletonized structure of the crude rubber.

3. A process for releasing the highly soluble rubber contained within the cells of crude rubber, comprising finely dispersing a volatile solvent in crude rubber, then maintaining the solvent dispersed in the rubber under superatmospheric pressure for a sufficient elapsed time for the solvent to cause substantially maximum swelling of the cells of the rubber, then heating the dispersion to a temperature of approximately 212° F. to cause substantially complete vaporization of the solvent while maintaining the dispersion under superatmospheric pressure to prevent such vaporization, and then suddenly releasing the pressure on the dispersion, whereby solvent instantaneously vaporizes and breaks down the skeletonized structure of the crude rubber.

4. A process for releasing the highly soluble rubber contained within the cells of crude rubber, comprising finely dispersing a casinghead gasoline solvent in crude rubber, then maintaining the solvent dispersed in the rubber under superatmospheric pressure for a sufficient elapsed time for the solvent to cause substantially maximum swelling of the cells of the rubber, then heating the dispersion to a temperature sufficient to cause substantially complete vaporization of the solvent while maintaining the dispersion under superatmospheric pressure to prevent such vaporization, and then suddenly releasing the pressure on the dispersion, whereby solvent instantaneously vaporizes and breaks down the skeletonized structure of the crude rubber.

5. A process for releasing the highly soluble rubber contained within the cells of crude rubber, comprising finely dispersing a volatile solvent in crude rubber, then maintaining the solvent dispersed in the rubber under superatmospheric pressure for a sufficient elapsed time for the solvent to cause substantially maximum swelling of the cells of the rubber, then heating the dispersion to a temperature sufficient to cause substantially complete vaporization of the solvent while maintaining the dispersion under superatmospheric pressure to prevent such vaporization, and then suddenly releasing the pressure and discharging the dispersion into a zone of substantially atmospheric pressure, whereby solvent instantaneousely vaporizes and breaks down the skeletonized structure of the crude rubber.

6. A process for releasing the highly soluble rubber contained within the cells of crude rubber, comprising finely dispersing a volatile solvent in crude rubber, then maintaining the solvent dispersed in the rubber under superatmospheric pressure for a sufficient elapsed time for the solvent to cause substantially maximum swelling of the cells of the rubber, then heating the dispersion to a temperature of approximately 212° F. while maintaining the dispersion under a superatmospheric pressure of about 150 pounds per square inch, and then suddenly releasing the pressure on the dispersion, whereby solvent instantaneously vaporizes and breaks down the skeletonized structure of the crude rubber.

7. A process for releasing the highly soluble rubber contained within the cells of crude rubber, comprising finely dispersing a volatile solvent in crude rubber by subjecting the rubber and solvent to violent turbulence, impact and shear, maintaining the dispersion under superatmospheric pressure for a period of time sufficient to cause the solvent to effect maximum swelling of the cells of the rubber, then heating the dispersion to a temperature sufficient to cause substantially complete vaporization of the solvent while maintaining the dispersion under superatmospheric pressure to prevent such vaporization, and then suddenly releasing the pressure on the dispersion and introducing the same into a vacuum zone, whereby solvent instantaneously vaporizes in an explosive manner and breaks down the skeletonized structure of the crude rubber.

MARVIN W. DITTO.
WILLIAM P. TORRINGTON.